United States Patent
Kim et al.

(10) Patent No.: US 7,429,871 B2
(45) Date of Patent: Sep. 30, 2008

(54) DEVICE FOR CONTROLLING ON DIE TERMINATION

(75) Inventors: Dong-keun Kim, Kyoungki-do (KR); Kyung-Hoon Kim, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 98 days.

(21) Appl. No.: 11/477,543

(22) Filed: Jun. 30, 2006

(65) Prior Publication Data

US 2007/0126469 A1 Jun. 7, 2007

(30) Foreign Application Priority Data

Sep. 29, 2005 (KR) .................. 10-2005-0091674
Dec. 22, 2005 (KR) .................. 10-2005-0127735

(51) Int. Cl.
*H03K 19/003* (2006.01)

(52) U.S. Cl. .......................... 326/30; 326/31
(58) Field of Classification Search ............ 326/30
See application file for complete search history.

(56) References Cited

U.S. PATENT DOCUMENTS

| 5,657,275 | A | 8/1997 | Yoshida |
| 6,208,168 | B1 * | 3/2001 | Rhee ........................... 326/83 |
| 6,212,109 | B1 | 4/2001 | Proebsting |
| 6,233,173 | B1 | 5/2001 | Chevallier et al. |
| 6,275,407 | B1 | 8/2001 | Otsuka |
| 6,339,541 | B1 | 1/2002 | Hardee et al. |
| 6,757,212 | B2 * | 6/2004 | Hamamoto et al. ......... 365/233 |
| 7,239,560 | B2 * | 7/2007 | Lee et al. ............... 365/189.05 |
| 2004/0240246 | A1 | 12/2004 | Golz et al. |
| 2005/0134304 | A1 | 6/2005 | Lee |
| 2005/0180229 | A1 | 8/2005 | Jin |
| 2005/0242832 | A1 | 11/2005 | Shin |

FOREIGN PATENT DOCUMENTS

| JP | 2004-171742 A | 6/2004 |
| JP | 2005-228858 A | 8/2005 |

* cited by examiner

*Primary Examiner*—James H Cho
(74) *Attorney, Agent, or Firm*—McDermott Will & Emery LLP

(57) ABSTRACT

An on die termination (ODT) control device includes a mode register set for generating a clock control signal based on mode set information; a clock control unit for receiving an internal clock signal and a delay locked loop (DLL) clock signal and outputting an intermediate internal clock signal and an intermediate DLL clock signal in response to the clock control signal; and an ODT control unit for controlling an ODT block by receiving an ODT control signal in response to the intermediate internal clock signal and the intermediate DLL clock signal.

26 Claims, 2 Drawing Sheets

DEVICE FOR CONTROLLING ON DIE TERMINATION

FIELD OF THE INVENTION

The present invention relates to a device for controlling an on die termination (ODT); and, more particularly, to an ODT control device for reducing unnecessary current consumption while an ODT block or a delay locked loop (DLL) is inactivated.

DESCRIPTION OF RELATED ARTS

As operating speed of a semiconductor memory device increases, swing ranges of signals which are interfaced between the semiconductor memory devices become narrower in order to minimize delay time required for transferring the signals.

As the swing ranges of signals become narrower, influence of external noise is increased. As a result, a signal reflection due to an impedance mismatching of an interface terminal is a critical concern. Generally, the impedance mismatching occurs from external noise, source voltage variation, operating temperature variation and manufacturing process variation.

When the impedance mismatching occurs, it is difficult to transfer data with a high rate and output data output from the interface terminal of the semiconductor memory device may be distorted. If impedance of a termination resistor is not matched properly, the transferred signal can be reflected, thereby resulting in a signal transmission failure.

An external fixed resistor presents difficulties in impedance matching owing to aging of an integrated circuit, operating temperature variation and manufacturing process variation. Accordingly, when the semiconductor memory device receives a distorted signal, problems such as setup/hold failure and judgment error of an input level frequently occurs.

Recently, technology for adjusting the impedance of the termination resistor has been developed in order to get the same impedance with an external reference impedance by controlling the number of turned-on transistors among a plurality of transistors connected in parallel.

Accordingly, the semiconductor memory device which requires a high operating speed is implemented with an impedance matching circuit known as an on-chip termination or on-die termination. In particular, various new technologies have been developed for improving data transferring speed of a double data rate (DDR) memory device. Appropriate termination resistance is needed for smoothly transferring signals between semiconductor memory devices.

SUMMARY OF THE INVENTION

It is, therefore, an object of the present invention to provide an on die termination (ODT) control device for reducing unnecessary current consumption by not supplying operating clocks with an ODT control unit while an ODT block or a delay locked loop (DLL) is inactivated.

In accordance with an aspect of the present invention, there is provided an on die termination (ODT) control device, including: a mode register set for generating a clock control signal based on mode set information; a clock control unit for receiving an internal clock signal and a delay locked loop (DLL) clock signal and outputting an intermediate internal clock signal and an intermediate DLL clock signal in response to the clock control signal; and an ODT control unit for controlling an ODT block by receiving an ODT control signal in response to the intermediate internal clock signal and the intermediate DLL clock signal.

In accordance with another aspect of the present invention, there is provided a semiconductor memory device for controlling an on die termination (ODT) block, including: a clock buffer for outputting an internal clock signal by buffering an external clock signal; a delay locked loop (DLL) for outputting a DLL clock signal by buffering the external clock signal; a mode register set for generating a clock control signal based on mode set information; a clock control unit for receiving the internal clock signal and the DLL clock signal and outputting an intermediate internal clock signal and an intermediate DLL clock signal in response to the clock control signal; and an ODT control unit for controlling the ODT block by receiving an ODT control signal in response to the intermediate internal clock signal and the intermediate DLL clock signal.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereinafter, an on die termination (ODT) control device in accordance with the present invention will be described in detail referring to the accompanying drawings.

Figure 1:
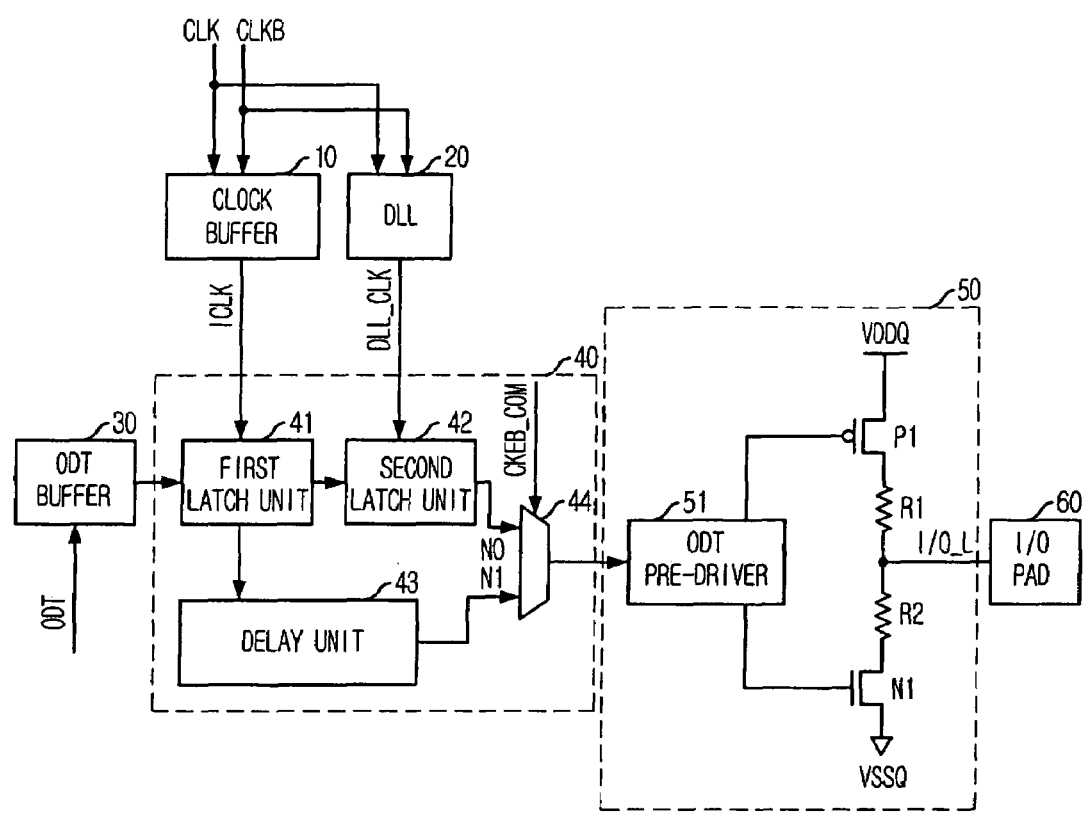
FIG. 1 is a block diagram of an on die termination (ODT) control device in accordance with a first embodiment of the present invention.

FIG. 1 is a block diagram of an on-die termination (ODT) control device in accordance with a first embodiment of the present invention.

As shown, the ODT control device in accordance with the first embodiment of the present invention includes a clock buffer 10, a delay locked loop (DLL) 20, an on-die termination (ODT) buffer 30, an on-die termination (ODT) control unit 40, an on-die termination (ODT) block 50 and an input/output (I/O) pad 60.

The clock buffer 10 buffers external clock signals CLK and CLKB to output the buffered signal as an internal clock signal ICLK.

The DLL 20 receives the external clock signals CLK and CLKB to output the received signal as a DLL clock signal DLL_CLK.

The ODT buffer 30 receives and buffers an ODT control signal ODT.

The ODT control unit 40 includes first and second latch units 41 and 42, a delay unit 43 and a multiplexer 44. The first latch unit 41 latches an output of the ODT buffer 30 in synchronization with the internal clock signal ICLK. The second latch unit 42 latches an output of the first latch unit 41 in synchronization with the DLL clock signal DLL_CLK to output the latched signal to a first node N0. The delay unit 43 delays the output of the first latch unit 41 for a predetermined time to output the delayed signal to a second node N1. The multiplexer 44 selects one of signals applied to the first and second nodes N0 and N1 in response to a clock selection signal CKEB_COM.

When the clock selection signal CKEB_COM is inactivated with a logic level 'LOW', the multiplexer 44 selects the signal applied to the first node N0 output through the first and second latch units 41 and 42 to output the selected signal to the ODT block 50. In a power down mode, i.e., when the clock selection signal CKEB_COM is activated with a logic level 'HIGH', the multiplexer 44 selects the signal applied to the second node N1 outputted through the first latch unit 41 and the delay unit 43 to output the selected signal to the ODT block 50.

The ODT block 50 includes an ODT pre-driver 51, a PMOS transistor P1, an NMOS transistor N1 and first and second resistors R1 and R2. The ODT pre-driver 51 receives and drives an output of the multiplexer 44 to output the driving signal to each gate of the PMOS transistor P1 and the NMOS transistor N1. Accordingly, the ODT block 50 controls an impedance of an input/output line I/O_L by turning on the PMOS transistor P1 and the NMOS transistor N1 to output the controlled impedance to the I/O pad 60.

As the operating speed of the semiconductor memory device is faster, current consumption of signals relating to clock signals such as CLK, CLKB and ICLK, and signals relating to the DLL such as DLL_CLK are increased. Particularly, the ODT control unit 40 of the above-mentioned ODT control device shown in FIG. 1 is continuously supplied with the internal clock signal ICLK and the DLL clock signal DLL_CLK even if the ODT block or the DLL is inactivated. As a result, the ODT control device in accordance with the first embodiment of the present invention consumes unnecessary current regardless of status of the ODT block or the DLL.

Figure 2:
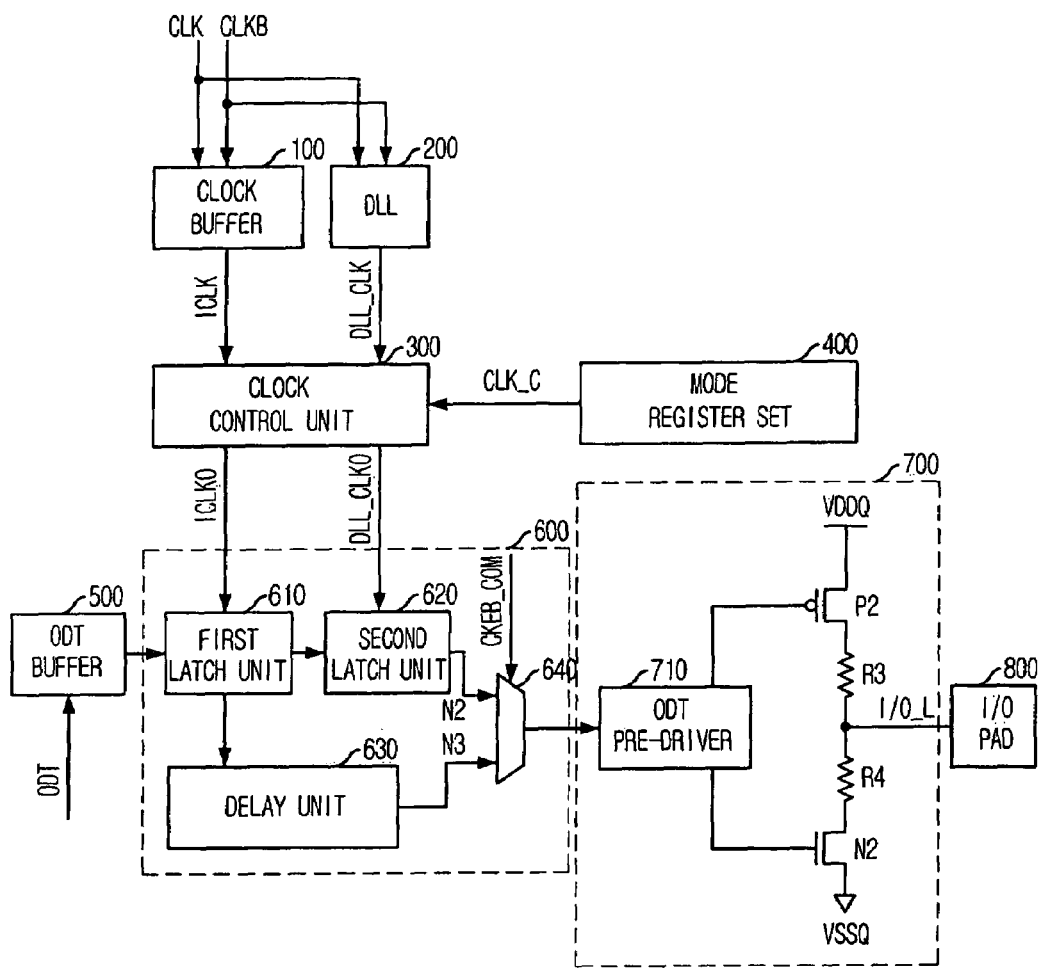
FIG. 2 is a block diagram of an ODT control device in accordance with a second embodiment of the present invention.

FIG. 2 is a block diagram of an ODT control device in accordance with a second embodiment of the present invention.

The ODT control device in accordance with the second embodiment of the present invention includes a clock buffer 100, a delay locked loop (DLL) 200, a clock control unit 300, a mode register set (MRS) 400, an on die termination (ODT) buffer 500, an on die termination (ODT) control unit 600, an on die termination (ODT) block 700 and an I/O pad 800.

The clock buffer 100 buffers external clock signals CLK and CLKB to output an internal clock signal ICLK.

The DLL 200 receives the external clock signals CLK and CLKB to output a DLL clock signal DLL_CLK.

The clock control unit 300 receives the internal clock signal ICLK and the DLL clock signal DLL_CLK to selectively output an intermediate internal clock signal ICLK0 and an intermediate DLL clock signal DLL_CLK0 in response to a clock control signal CLK_C.

The MRS 400 generates the clock control signal CLK_C based on mode set information stored in a register. The mode set information includes a status of the ODT block 700 and a status of the DLL 200.

The ODT buffer 500 buffers an ODT control signal ODT to output the buffered signal to the ODT control unit 600.

The ODT control unit 600 includes first and second latch units 610 and 620, a delay unit 630 and a multiplexer 640. The first latch unit 610 latches an output of the ODT buffer 500 in synchronization with the intermediate internal clock signal ICLK0. The second latch unit 620 latches an output of the first latch unit 610 in synchronization with the intermediate DLL clock signal DLL_CLK to output the latched signal to a first node N2. The delay unit 630 delays the output of the first latch unit 610 for a predetermined time to output the delayed signal to a second node N3. The multiplexer 640 selects one of signals applied to the first and second nodes N2 and N3 in response to a clock selection signal CKEB_COM.

When the clock selection signal CKEB_COM is inactivated with a logic level 'LOW', the multiplexer 640 selects the signal applied to the first node N2 output through the first and second latch units 610 and 620 to output the selected signal to the ODT block 700. In a power down mode, i.e., when the clock selection signal CKEB_COM is activated with a logic level 'HIGH', the multiplexer 640 selects the signal applied to the second node N3 output through the first latch unit 610 and the delay unit 630 to output the selected signal to the ODT block 700.

The ODT block 700 includes an ODT pre-driver 710, a PMOS transistor P2, an NMOS transistor N2 and first and second resistors R3 and R4. The ODT pre-driver 710 receives and drives an output of the multiplexer 710 to output the driving signal to each gate of the PMOS transistor P2 and the NMOS transistor N2. Accordingly, the ODT block 710 controls an impedance of an input/output line I/O_L by turning on the PMOS transistor P2 and the NMOS transistor N2 to output the controlled impedance to the I/O pad 800.

Figure 3:
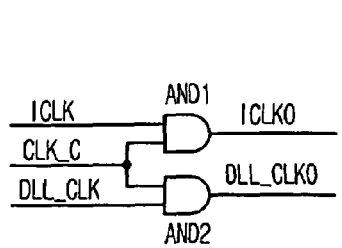
FIG. 3 is a detailed circuit diagram of a clock control unit shown in FIG. 2.

FIG. 3 is a detailed circuit diagram depicting the clock control unit 300 shown in FIG. 2.

As shown, the clock control unit 300 includes first and second AND gates AND1 and AND2. The first AND gate AND1 performs an AND operation of the internal clock signal ICLK and the clock control signal CLK_C to output the intermediate internal clock signal ICLK0; and the second AND gate AND2 performs an AND operation of the DLL clock signal DLL_CLK and the clock control signal CLK_C to output the intermediate DLL clock signal DLL_CLK0.

Hereinafter, referring to FIGS. 2 to 3, an operation for controlling the ODT block of the ODT control device in accordance with the second embodiment of the present invention will be described.

First, the MRS 400 outputs the clock control signal CLK_C to be activated with a logic level 'HIGH' when both of the ODT block 700 and the DLL 200 are activated.

In this case, the clock control unit 300 outputs the intermediate internal clock signal ICLK0 and the intermediate DLL clock signal DLL_CLK0 to the ODT control unit 600.

That is, the first AND gate AND1 of the clock control unit 300 outputs the intermediate internal clock signal ICLK0 activated with a logic level 'HIGH' when both of the internal clock signal ICLK and the clock control signal CLK_C are activated with a logic level 'HIGH'; and the second AND gate AND2 of the clock control unit 300 outputs the intermediate DLL clock signal DLL_CLK0 activated with a logic level 'HIGH' when both of the DLL clock signal DLL_CLK and the clock control signal CLK_C are activated with a logic level 'HIGH'.

Accordingly, if both of the ODT block 700 and the DLL 200 are activated, the intermediate internal clock signal ICLK0 is applied to the first latch unit 610 and the intermediate DLL clock signal DLL_CLK0 is applied to the second latch unit 620.

Continuously, the first latch unit 610 receives the ODT control signal ODT and outputs the received signal to the second latch unit 620 in synchronization with the intermediate internal clock signal ICLK0. The second latch unit 620 receives the output of the first latch unit 610 and outputs the received signal in synchronization with the intermediate DLL clock signal DLL_CLK0 to the first node N2.

Likewise, the first latch unit 610 receives the ODT control signal ODT and outputs the received signal to the delay unit 630 in synchronization with the intermediate internal clock signal ICLK0. The delay unit 630 receives the output of the first latch unit 610 and delays the received signal to output the delayed signal to the second node N3.

The multiplexer 640 selects the signal at the first node N2 to output the selected signal to the ODT pre-driver 710 of the ODT block 700 when the clock selection signal CKEB_COM is inactivated with a logic level 'LOW'; and selects the signal at the second node N3 to output the selected signal to the ODT pre-driver 710 of the ODT block 700 when the clock selection signal CKEB_COM is activated with a logic level 'HIGH', i.e., the power down mode.

The ODT pre-driver 710 drives the output of the multiplexer 640 to output the driving signal to the PMOS transistor P2 and the NMOS transistor N2. Accordingly, the ODT block 700 controls the impedance of the input/output line I/O_L by turning on the PMOS transistor P2 and the NMOS transistor N2 to output the controlled impedance to the I/O pad 800.

On the other hand, the MRS 400 outputs the clock control signal CLK_C to be inactivated with a logic level 'LOW' if any of the ODT block 700 and the DLL 200 is inactivated.

In this case, the clock control unit 300 does not output the intermediate internal clock signal ICLK0 and the intermediate DLL clock signal DLL_CLK0 to the ODT control unit 600.

That is, if the clock control signal CLK_C is inactivated with a logic level 'LOW', the first AND gate AND1 of the clock control unit 300 outputs the intermediate internal clock signal ICLK0 inactivated with a logic level 'LOW' regardless of the internal clock ICLK. The second AND gate AND2 of the clock control unit 300 outputs the intermediate DLL clock signal DLL_CLK0 inactivated with a logic level 'LOW' regardless of the DLL clock signal DLL_CLK.

As described above, the on die termination (ODT) control device of the present invention reduces unnecessary current consumption by not supplying the internal clock signal ICLK and the DLL clock signal DLL_CLK with the ODT control unit 600 while any of the ODT block 700 or the DLL 200 is inactivated.

The present application contains subject matter related to Korean patent application Nos. 2005-91674 & 2005-127735, filed in the Korean Patent Office on Sep. 29, 2005 & Dec. 22, 2005, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An on die termination (ODT) control device, comprising:
   a mode register set for generating a clock control signal based on mode set information;
   a clock control unit for receiving an internal clock signal and a delay locked loop (DLL) clock signal and outputting an intermediate internal clock signal and an intermediate DLL clock signal in response to the clock control signal; and
   an ODT control unit for controlling an ODT block by receiving an ODT control signal in response to the intermediate internal clock signal and the intermediate DLL clock signal.

2. The ODT control device as recited in claim 1, further comprising:
   a clock buffer for outputting the internal clock signal to the clock control unit by buffering an external clock signal; and
   a DLL for outputting the DLL clock signal to the clock control unit by buffering the external clock signal.

3. The ODT control device as recited in claim 2, wherein the DLL clock signal is activated when the DLL is activated.

4. The ODT control device as recited in claim 2, wherein the mode set information includes a status of the ODT block and a status of the DLL.

5. The ODT control device as recited in claim 2, wherein the mode register set outputs the clock control signal with an inactivated state if any of the ODT block and the DLL is inactivated.

6. The ODT control device as recited in claim 2, wherein the clock control unit outputs the intermediate internal clock signal and the intermediate DLL clock signal to the ODT control unit when the clock control signal is activated.

7. The ODT control device as recited in claim 2, wherein the clock control unit includes:
   a first logic element for performing a logic operation of the internal clock signal and the clock control signal to output the result as the intermediate internal clock signal to the ODT control unit; and
   a second logic element for performing a logic operation of the DLL clock signal and the clock control signal to output the result as the intermediate DLL clock signal to the ODT control unit.

8. The ODT control device as recited in claim 7, wherein the first logic element includes an AND gate.

9. The ODT control device as recited in claim 7, wherein the second logic element includes an AND gate.

10. The ODT control device as recited in claim 1, wherein the ODT control unit includes:
    a first latch unit for latching the ODT control signal in synchronization with the intermediate internal clock signal;
    a second latch unit for latching an output of the first latch unit in synchronization with the intermediate DLL clock signal;
    a delay unit for delaying the output of the first latch unit; and
    a multiplexer for selecting one of outputs of the second latch unit and the delay unit based on a clock selection signal to output the selected signal to the ODT block.

11. The ODT control device as recited in claim 10, wherein the multiplexer selects the output of the second latch unit when the clock selection signal is inactivated; and selects the output of the delay unit when the clock selection signal is activated.

12. The ODT control device as recited in claim 11, wherein the clock selection signal is activated during a power down mode.

13. A semiconductor memory device for controlling an on die termination (ODT) block, comprising:
    a clock buffer for outputting an internal clock signal by buffering an external clock signal;
    a delay locked loop (DLL) for outputting a DLL clock signal by buffering the external clock signal;
    a mode register set for generating a clock control signal based on mode set information;
    a clock control unit for receiving the internal clock signal and the DLL clock signal and outputting an intermediate internal clock signal and an intermediate DLL clock signal in response to the clock control signal; and
    an ODT control unit for controlling the ODT block by receiving an ODT control signal in response to the intermediate internal clock signal and the intermediate DLL clock signal.

14. The semiconductor memory device as recited in claim 13, wherein the mode set information includes a status of the ODT block and a status of the DLL.

15. The semiconductor memory device as recited in claim 13, wherein the mode register set outputs the clock control signal with an inactivated state if any of the ODT block and the DLL is inactivated.

16. The semiconductor memory device as recited in claim 13, wherein the clock control unit includes:
   a first logic gate for performing an AND operation of the internal clock signal and the clock control signal to output the result as the intermediate internal clock signal to the ODT control unit; and
   a second logic gate for performing an AND operation of the DLL clock signal and the clock control signal to output the result as the intermediate DLL clock signal to the ODT control unit.

17. The semiconductor memory device as recited in claim 13, wherein the ODT control unit includes:
   a first latch unit for latching the ODT control signal in synchronization with the intermediate internal clock signal;
   a second latch unit for latching an output of the first latch unit in synchronization with the intermediate DLL clock signal;
   a delay unit for delaying the output of the first latch unit; and
   a multiplexer for selecting one of outputs of the second latch unit and the delay unit based on a clock selection signal to output the selected signal to the ODT block.

18. The semiconductor memory device as recited in claim 17, wherein the multiplexer selects the output of the second latch unit when the clock selection signal is inactivated while selecting the output of the delay unit when the clock selection signal is activated.

19. The semiconductor memory device as recited in claim 18, wherein the clock selection signal is activated during a power down mode.

20. An on die termination (ODT) control device, comprising:
   a mode register set for generating a clock control signal;
   a clock control unit for receiving the clock control signal and external clock signals, and activating an intermediate internal clock signal and an intermediate DLL clock signal in response to the clock control signal; and
   an ODT control unit for controlling an ODT block by receiving an ODT control signal in response to the intermediate internal clock signal and the intermediate DLL clock signal.

21. The ODT control device as recited in claim 20, wherein the clock control unit outputs the intermediate internal clock signal and the intermediate DLL clock signal to the ODT control unit when the clock control signal is activated.

22. The ODT control device as recited in claim 20, wherein the clock control unit includes:
   a first logic element for performing a logic operation of an internal clock signal and the clock control signal to output the result as the intermediate internal clock signal to the ODT control unit; and
   a second logic element for performing a logic operation of a DLL clock signal and the clock control signal to output the result as the intermediate DLL clock signal to the ODT control unit.

23. The ODT control device as recited in claim 22, wherein each of the first and second logic elements includes an AND gate.

24. The ODT control device as recited in claim 20, wherein the ODT control unit includes:
   a first latch unit for latching the ODT control signal in synchronization with the intermediate internal clock signal;
   a second latch unit for latching an output of the first latch unit in synchronization with the intermediate DLL clock signal;
   a delay unit for delaying the output of the first latch unit; and
   a multiplexer for selecting one of outputs of the second latch unit and the delay unit based on a clock selection signal to output the selected signal to the ODT block.

25. The ODT control device as recited in claim 24, wherein the multiplexer selects the output of the second latch unit when the clock selection signal is inactivated; and selects the output of the delay unit when the clock selection signal is activated.

26. The ODT control device as recited in claim 25, wherein the clock selection signal is activated during a power down mode.

* * * * *